United States Patent [19]

Hawkes et al.

[11] Patent Number: 4,604,559
[45] Date of Patent: Aug. 5, 1986

[54] APPARATUS AND METHOD FOR PROVIDING USEFUL AUDIO FEEDBACK TO AID IN THE OPERATION OF REMOTELY CONTROLLED POWERED MANIPULATORS

[75] Inventors: Graham S. Hawkes; Walter I. Golz, both of Oakland, Calif.

[73] Assignee: Deep Ocean Engineering Incorporated, Oakland, Calif.

[21] Appl. No.: 466,433

[22] Filed: Feb. 15, 1983

[51] Int. Cl.⁴ .............................................. G05B 9/02
[52] U.S. Cl. .................................... 318/563; 318/305; 318/317; 318/490; 318/565; 364/190; 332/20
[58] Field of Search .............. 318/490, 563, 565, 628, 318/317, 305; 332/20, 39; 364/190

[56] References Cited
U.S. PATENT DOCUMENTS

| 2,995,100 | 8/1961 | Edwards | 318/460 X |
| 3,585,477 | 6/1971 | Shacknow | 318/490 X |
| 4,150,326 | 4/1979 | Engelberger et al. | 318/563 |
| 4,292,574 | 9/1981 | Sipin et al. | 318/490 X |
| 4,375,609 | 3/1983 | Wolf | 318/317 X |
| 4,377,784 | 3/1983 | Saito et al. | 318/490 X |
| 4,422,619 | 12/1983 | Griffiths | 318/563 X |

Primary Examiner—B. Dobeck
Attorney, Agent, or Firm—Manfred M. Warren; Robert B. Chickering; Glen R. Grunewald

[57] ABSTRACT

The user of a remotely controlled, powered manipulator is provided with audible feedback signals which provide useful information relating to the force and speed of the motor. An audio tone is generated and is frequency modulated by a signal which corresponds to motor speed. The tone is amplitude modulated by a signal corresponding to motor force thus providing the user with an intuitively interpretable feedback signal having a speed-proportional pitch and force-proportional volume. In the case of an electric motor, voltage and current can be monitored to provide speed and force signals respectively. Additional modulation means are disclosed for introducing a force-proportional warble component to said tone.

23 Claims, 2 Drawing Figures

APPARATUS AND METHOD FOR PROVIDING USEFUL AUDIO FEEDBACK TO AID IN THE OPERATION OF REMOTELY CONTROLLED POWERED MANIPULATORS

BACKGROUND AND FIELD OF THE INVENTION

The present invention generally relates to sensory feedback systems for improving user control of remotely operated devices. In particular, the invention relates to audible feedback systems utilized in connection with remotely operated power driven manipulators such as "robot arms" and the like.

Remotely operated manipulators are finding wide use in fields ranging from surgery to deep sea exploration and in environments ranging from the subterranean to the surfaces of distant planets. The users of remotely operated manipulators have traditionally monitored manipulator position and motion through the use of closed circuit television. This enables the operator to see the effects of his control inputs in real time and make appropriate adjustments. Video feedback systems do not, however, provide sufficient information concerning manipulator force. Remotely operated manipulators are usually employed in hostile or humanly inaccessible environments to make repairs or conduct explorations. In the case of making critical repairs, the lack of force information can lead to an increase in damage rather than the completion of desired repair.

Various schemes exist for providing user feedback information on force, speed, displacement and the like. Many of the prior art systems are analogous to the well known force feedback devices used in aircraft to give a natural "feel" to pilot controls. Other prior art systems utilize various transducers to sense displacement, speed, and force and use the information derived therefrom to operate a duplicate manipulator which is placed proximately to the operator for direct viewing.

The prior art devices primarily utilize the user's visual and tactile senses. Most of the prior art systems which provide feedback relating to speed, displacement, or force, require the use of special transducers which add to the complexity of the remote manipulator as well as its expense.

SUMMARY OF THE INVENTION

In contrast to the aforementioned visual and tactile feedback systems, the present invention provides feedback in the form of audible sound. The instant invention supplements the visual feedback systems of the prior art with an audible sound input to the operator which, through various combinations of frequency and amplitude modulation, conveys information concerning the force and speed of a remotely operated manipulator. The essential principles of the invention can be used with all types of powered manipulator system including hydraulic, pneumatic, and electric. When used with systems which employ electric motors, the present invention can provide useful information relating to force and speed without requiring the use of special transducers. Motor voltage can be monitored to provide a signal corresponding to speed and motor current can be monitored to provide a force proportional signal. The speed signal can then be used to frequency modulate an audio tone and the force signal is used to amplitude modulate the tone. In most DC electric motor applications these signals, while not absolutely accurate indicators of speed and force, nevertheless provide sufficiently accurate information to effect good control of the manipulator. By sensing motor voltage and current at the power supply, which is typically located in close proximity to the user, the need for extra cabling or telemetry devices for relaying speed and force information from the remote manipulator itself is eliminated.

OBJECTS OF THE INVENTION

Accordingly, it is an object of the present invention to provide an improved feedback apparatus and method for supplying information to the user of remotely operated powered manipulators by generating appropriately modulated sound signals which can be intuitively interpreted by the operator as indicators of speed and force.

A further object of the present invention is to provide a user feedback system which, when utilized with electric motor powered manipulators, eliminates the need for special force and diplacement transducers.

A still further object is to provide a feedback system which allows a user to control a remotely operated manipulator with precision and speed heretofore unobtainable in a system of comparable simplicity.

Another object of the present invention is to provide an audio feedback system which is readily adaptable for use with all types of powered remotely operated manipulators including electric, hydraulic and pneumatic types.

The apparatus and method of the instant invention has other objects and features of advantage which will be set forth in and become apparent from the following description of the preferred embodiment and the accompanying drawings.

DETAILED DESCRIPTION OF THE INVENTION

Figure 1:
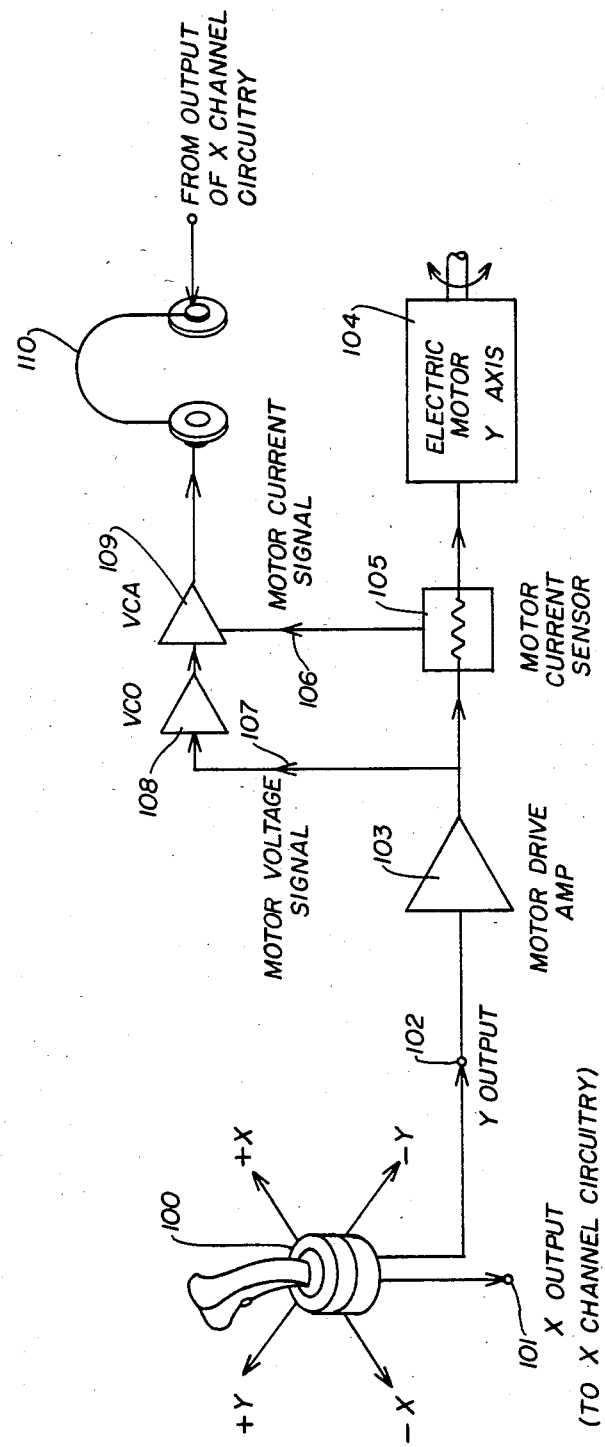
FIG. 1 is a block functional diagram of an apparatus embodying the present invention.

Referring to FIG. 1, an audio feedback system is illustrated for monitoring and aiding in user control of a remotely operated, powered manipulator. For purposes of simplicity, only a single motor is illustrated along with its associated audio feedback circuitry. Typical applications will involve the use of multiple motors to effect three-dimensional movement.

In FIG. 1, an X-Y joystick 100 is illustrated as a typical multi-axis controller for a remote manipulator. In the preferred embodiment, joystick 100 is a Measurement Systems Incorporated Model 446 or its equivalent. The X output 101 and the Y output 102 supply differential voltage signals which are amplified and otherwise processed to control reversible DC servo motors. The joystick 100, in the preferred embodiment, is an isometric force control comprising piezo-resistive semiconductor strain measuring devices in a four-arm bridge configuration. This configuration gives a DC voltage output proportional to applied force in the range of plus or minus 10 volts DC full scale.

In FIG. 1, the Y axis output 102 from joystick 100 is connected to a motor drive servo amplifier 103 which is used to drive the Y axis manipulator motor 104. An electrical signal proportional to motor force is developed across motor current sensor 105. In practice, the motor current sensor need be nothing more than a resistor in series with the motor power leads. This provides a voltage drop across the resistor which is proportional to motor drive current and thus can be utilized as a force proportional motor current signal 106.

An electrical signal 107 proportional to motor speed is provided at the output of amplifier 103 by sampling motor voltage. This motor voltage signal 107 is proportional to motor speed and is used as the control input to voltage controlled oscillator (VCO) 108. Accordingly, VCO 108 provides an output which is frequency modulated in proportion to the motor voltage signal 107 thus providing at the output of 108 an oscillator signal having a frequency which varies in proportion to motor speed.

Voltage controlled amplifier (VCA) 109 has as its input the frequency modulated output signal from VCO 108. Motor current signal 106 is connected to the control input of VCA 109. Accordingly, VCA 109 is an amplitude modulator which varies the amplitude of the VCO signal in proportion to the motor current signal 106. This has the effect of providing a signal whose volume is proportional to motor force. The output of VCA 109 is connected to one side of headphone 110 for audibly reproducing the frequency and amplitude modulated signal for user listening and interpretation.

As is noted on FIG. 1, identical circuitry is used in connection with the X output from joystick 100 to provide an audio signal in connection with the operation of the electric motor for the X axis. The output from the X channel circuitry is supplied to the other side of headphone 110 for operator listening and interpretation.

Figure 2:
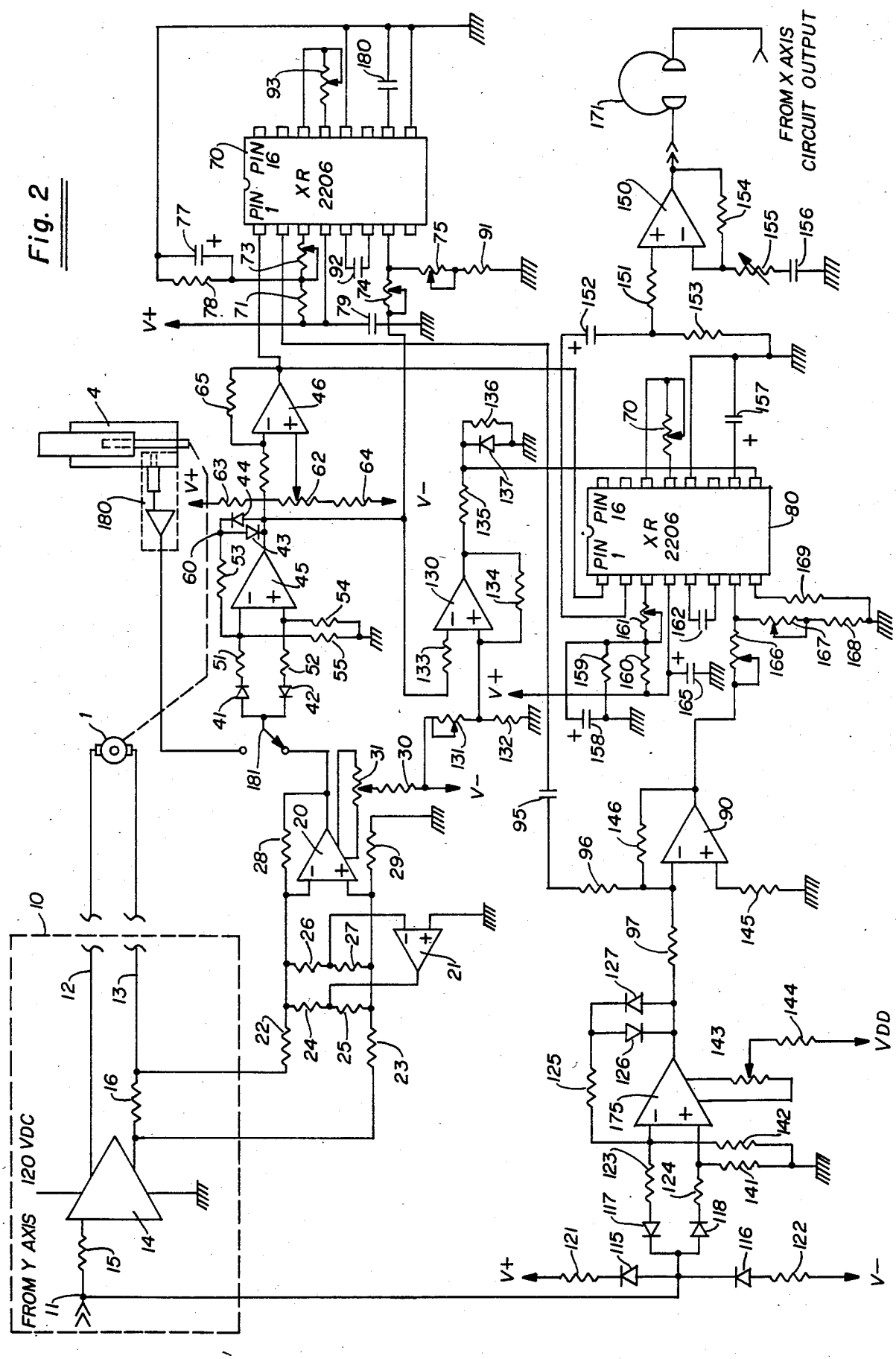
FIG. 2 is an electrical schematic diagram of an embodiment of the present invention.

The circuit functions illustrated in FIG. 1 illustrate a very simple embodiment of the instant invention which is easy to implement and which provides useful information to the operator. It has been found that additional modulative processing can be employed to further increase the usefulness of the instant invention. In FIG. 2 a preferred embodiment is schematically illustrated which employs, in addition to the simple amplitude and frequency modulation processing illustrated in FIG. 1, another processing step which provides a warbling or fluttering effect to the audio output signal. The aural effect at the operator's ears is a warbling or fluttering tone whose frequency rises proportional to motor voltage and whose amplitude and warble rate are proportional to motor current. Other additional features which are illustrated in the circuitry of FIG. 2 include provisions for silencing the output so that with no load or input drive signal to the motor, there is no output to the operator's head set. Other features and options which increase the usefulness of the instant invention will be explained in the following description of the circuitry illustrated in FIG. 2.

As will be explained herein, the method and apparatus of the instant invention can be employed on a variety of types of remotely controlled powered manipulators including those utilizing electric, hydraulic, or pneumatic power or various combinations of the foregoing.

The preferred embodiment schematically illustrated in FIG. 2 is designed for use in connection with a remotely operated manipulator employing electrohydraulic actuators well suited for underwater deployment. These actuators utilize bidirectional DC electric motors as their primary source of motive power. Accordingly, the voltage and current supplied to the DC electric motor can be monitored to provide useful information concerning the speed and force of the manipulator which is driven by the motor. In FIG. 2, motor 1 is a permanent magnet type DC electric motor manufactured by the Bodine Electric Company Model No. 32D5BEPM-W2. Hydraulic actuator 4 is shown connected to motor 1 by a dotted line indicating that the actuator is coupled to and driven by the motor 1. In the upper lefthand portion of FIG. 1 a power module 10 is shown having an input 11 for receiving a plus or minus 10 volt DC signal from the Y axis output 102 of controller 100 illustrated in FIG. 1. Power module 10 is, in the preferred embodiment, a Glenteck Model GA 4552-4. Output leads 12 and 13 from power module amplifier 14 are shown connected to motor 1 for supplying a drive signal of plus or minus 120 VDC at currents up to 3 amps. Resistor 15 is an input resistor for power amplifier 14. Resistor 16 is a current sensing resistor in series with power module 10 and the drive motor 1 for the purpose of sensing motor current and generating a DC voltage proportional thereto. In the preferred embodiment, resistor 16 is a 0.1 ohm precision power-type resistor. The nominal magnitude of motor current ranges from 0 to plus or minus 3 amps. Accordingly, the voltage dropped across resistor 16 due to motor current is plus or minus 0.3 VDC. Resistor 16 provides a means responsive to manipulator speed by sensing the analogous parameter of motor voltage and provides an electrical signal proportional thereto.

IC 20 and IC 21 are precision integrated circuit (IC) operational amplifiers (OP amps) configured together with their associated resistors 22 through 29 as differential amplifiers. The manipulator force or torque signal developed across resistor 16 is sensed and amplified by the differential amplifier made up of integrated circuit 20 and integrated circuit 21. IC 21 functions as a summing amplifier which subtracts the Common Mode Voltage seen at resistors 22 and 23 both of which are 20K 0.01% tolerance resistors. Summing amplifier IC 21 thereby lowers the Common Mode input voltage at IC 20 to below specified maximums typical of monolithic linear integrated circuits. Resistors 24, 25, 26 and 27 are all 1K in value.

In the preferred embodiment the power module 10 is configured in a bridged output mode allowing bidirectional output voltage excursions up to plus or minus 120 VDC. Resistors 22, 23, 24 and 25 form a precision differential voltage divider and should therefore employ precision matched resistors with low temperature coefficients. The functional block created by IC 20 and IC 21 creates a low-cost, high voltage differencing amplifier with 20 dB gain. The output voltage gain is determined by the ratio of resistor 28 to resistor 22. In the preferred embodiment resistor 28 is a 200K 1% resistor as is resistor 29.

Resistor 30 and potentiometer 31 which are 2K and 200K respectively in value form an input offset control which may be omitted if the precision OP amp used as IC 20 has sufficiently low input offset voltage. IC 20 should be selected for high CMRR, low input offset voltage and current, with low $V_{os}$ drift such as OP 07, LF 363, AD 521, or other OP amps.

The output of IC 20 is direct coupled to a precision rectifier comprised of diodes 41, 42, 43 and 44 together with IC 45 and resistors 51, 52, 53, 54 and 55. The aforementioned diodes are silicon small signal types (1N4148 or equivalent) which rectify the input current. IC 45 is an OP amp configured an inverting unity gain amplifier. Resistors 51 through 55 are all 10K 1 percent types.

When the input voltage to IC 45 is positive, diode 41 conducts, producing, at point 60, a voltage equal to $-(+V+I_{in}R_{D41})$, where $R_{D41}$ is the forward biased diode resistance of diode 41 and $I_{in}$ is the input current. Because the amplifier gain is unity, $I_{in}$ equals $I_{out}$. The voltage appearing at the output of IC 45 is the sum of the voltages at point 60 and the drop across forward biased diode 44. The output voltage from integrated circuit 45 is accordingly equal to $-(+V+I_{out}R_{D41})+I_{out}R_{D44}$. For negative inputs diode 42 conducts and produces voltage $(-V-I_{in}R_{D42})/2$ at the noninverting input of IC 45.

Because the potential difference across the two inputs of IC 45 is 0 volts, the voltage at both inputs is the same. Since diode 41 is reversed biased, there is no current flow through resistor 51. Therefore the voltage at the inverting input of IC 45 is due to the voltage divider created by resistors 53 and 55. This produces a voltage $(-V-I_{out}R_{D42})$ at point 60. Diode 44 adds an additional voltage of $I_{out}R_{D44}$ volts. The output is again equal to $-V$. Diode 43 eliminates latch-ups by allowing the output to drive the inverting input negative when the input voltage is approximately equal to 0 volts. Diodes 41 through 44 should be matched for $V_f$ and resistors 51 through 55 should be 1% metal film types. IC 45 may be a low-cost general purpose OP amp, LM741 or equivalent. Input offset triming may be accomplished by the circuitry shown for IC 175.

The output from IC 45 is negative in polarity and equal in magnitude to the output of the differencing amplifier formed by IC 20. Due to the +20 dB gain achieved in IC 20, the output from IC 45 is $-10|V_{R16}|$. IC 46 is configured as a direct coupled inverting amplifier with a gain of 10 dB. Potentiometer 62 and associated resistors 63 and 64 form an adjustable offsetting input to IC 46 and reference the output voltage to V+/2 which is the zero reference for the AM input of VCO IC70. Potentiometer 62 is in the preferred embodiment a 200K pot. Resistors 63 and 64 are 6.8K in value.

IC 70 and IC 80 are both EXAR 2206 monolithic IC Function Generators capable of producing sine, triangle, or square wave outputs. IC 70 and IC 80 are shown in outlined form so that the pin arrangement seen in FIG. 2 corresponds to the pin arrangement on the actual chip itself. Pins 1 and 16 are labeled on both IC 70 and IC 80 to show that pin numbering starts at 1 and proceeds sequentially counterclockwise to pin number 16. References to pin numbers on IC 70 and IC 80 are references made to the actual chip pin numbers. The output of IC 70 at pin 2 is a low-frequency sine wave whose voltage and frequency vary with the magnitude of the output voltage at IC 46. Resistor 65 is a feedback resistor for IC 46 and has a value of 33K. Due to the gain developed in IC 46, the output voltage at pin 2 of IC 70 drives the output stage to saturation before the motor current reaches its full range of plus or minus 3 amps, however the output frequency continues to rise. Potentiometer 73 shown connected to pin 3 of IC 70 sets the gain of the output at pin 2 of IC 70. Potentiometer 73 is a 200K pot and resistor 71 is 5.1K. Resistor 78 is also 5.1K and is paralleled by capacitor 77 which is a 10 microfarad 10 volt capacitor. Capacitor 79 is a one microfarad capacitor. Potentiometer 74 is a 25K pot and potentiometer 75 is 200K with a 1K resistor 91 placed in series with ground. The ranges and values of potentiometers 74 and 75 and capacitor 92 may be adjusted to achieve appropriate scaling of the desired output signal.

Potentiometer 93 is a 500 ohm pot which allows adjustment of the sine wave shape to minimize distortion.

The low-frequency sine wave output of IC 70 is AC coupled to IC 90 through capacitor 95 and resistor 96 which have values of 10 microfarads and 10K ohms respectively. IC 90 is a unity gain summing inverting amplifier. This amplifier sums the signals developed across resistor 96 and 10K ohm resistor 97. IC 90 is an absolute value circuit similar to the one discussed in connection with IC 45 except that the output of IC 90 is positive polarity with magnitude from 0 to 10 VDC proportional to the control voltage present at the input 11 to power module 10. Diodes 115 and 116 and their associated 1K ohm resistors 121 and 122 form an input protection circuit to prevent voltage spikes or inadvertent high voltages from damaging the inputs to IC 175. Resistors 123 and 124 are 10K 1% tolerance resistors and together with diodes 117 and 118 perform the same function as do the related components in the input circuit to IC 45. Similarly, feedback resistor 125 is a 10K 1% tolerance resistor. Diodes 126 and 127 are similar in type and circuit function to the previously described diodes 43 and 44 which are used on the output of IC 45.

The summed inverted output of IC 90 provides the frequency sweep control voltage at pin 7 of IC 80. The magnitude of the output modulated signal from IC 80 is determined by the DC voltage at pin 1 of IC 80. This voltage has been established by the output of IC 46 and is proportional to motor current and hence proportional to manipulator force. Accordingly, the output signal at pin 2 of IC 80 is a sine wave swept across a mid range frequency band, i.e., (400 hertz to 4 kilohertz) when driven by a 0 to 10 volt motor voltage control signal from joystick 100. This sine wave is modulated by the low-frequency AC output generated in IC 70. The amplitude of the swept modulated output is determined by a DC control signal proportional to the motor current signal developed across resistor 16. The output at pin 2 of IC 80 is AC coupled to a low power audio amplifier with a variable gain capable of powering standard stereo headphones.

The aural effect heard by the user through the headphone is a warbling or fluttering tone whose frequency rises proportional to motor voltage and whose amplitude and warble rate are proportional to motor current. With no load or input drive signal to the motor, the output to the user's headset is 0 volts. The amplitude control signal at pin 1 of IC 80 is weighted to produce a steeply rising output voltage over the lower range of motor current values (e.g. less than plus or minus 1 amp). As motor currents rise above this range, the effect becomes less noticeable, given the operator greater sensitivity to motor load and force changes in the low current range. This characteristic may be adjusted then modified by selecting resistor values and may be changed to give greater linearity or greater sensitivity as may be appropriate for controlling the manipulator in different situations.

IC 130 is configured as a comparator with an output clamp whose input is driven by the negative going motor current signal. The switching point is set at approximately minus 3.0 volts by the ratio of the 10K potentiometer 131 and the 33K resistor 132. Input resistor 133 is a 4.7K current limiting resistor placed in series between the output of IC 45 and the inverting input of IC 130. Feedback resistor 134 is a 3.3 megohm unit connected between the output and the noninverting input of IC 130. When the input to IC 130 taken between potentiometer 131 and resistor 132 drops below negative 3.0 volts, the output switches from V− to V+. Due to the diode clamp and voltage divider circuit formed by 68k resistor 135, 33k resistor 136, and diode 137. The comparator output switches from approximately −0.7 volts to +5.0 volts. This provides a logic level control signal to the FSK input at pin 9 of IC 80. When the comparator IC 130 switches, pin 9 on IC 80 goes high which switches the output of IC 80 to a steady state sine wave. This gives the operator a positive indication when the motor current magnitude reaches a preset limit as defined by the ratio of the resistances 131 to 132. Potentiometer 131 may be adjusted to change this threshold as is required in different applications.

The XR 2206 is a commonly used monolithic function generator and hence the methods for selecting the values of the associated timing resistors and capacitors are well documented in the manufacturers literature. Circuit component values given herein have been found satisfactory when used in connection with the embodiment illustrated in FIG. 2. The values of the remaining components associated with the IC OP amps will be given for purposes of completeness. Resistors 141 and 142 are both 10K and perform identical functions to resistors 54 and 55 associated with IC 45. Potentiometer 143 is a 200K pot in series with a 2K resistor 144. Resistor 145 is connected between the noninverting input of IC 90 in ground and has a value of 3.3K. IC 90 is configured as a 0 dB summing amp. Feedback resistor 146 has a value of 10K. IC 150 is used to amplify the output from IC 80 to a level suitable for driving headphones. Input resistor 151 is 1K. Capacitor 152 is a 20 microfarad device. Resistor 153 has a value of 100K. Feedback resistor 154, connected between the input and output of IC 150, is a 10K resistor. Potentiometer 155 is a 20K pot in series with a 10 microfarad capacitor 16. Capacitors 157 and 158 are both 10 microfarad units. Capacitor 180 is a 1 microfared unit. Resistors 159 and 160 are both 5.1K. Potentiometer 161 is a 200K pot. Timing capacitor 162 connected between pins 5 and 6 of IC 80 is a 1 microfarad device. Timing capacitor 92 connected between pins 5 and 6 of IC 70 is a 10 microfarad device. Capacitor 165 is a one microfarad device. Potentiometer 166 has a value of 25K ohms. Potentiometer 167 is a 200K pot in series with resistor 168 which has a value of 5K ohms. Resistor 169 is a 4.7K unit. Potentiometer 170 is connected between pins 13 and 14 of IC 80 and is a 500 ohm unit used to adjust for minimum sine wave distortion. Headphone 171 has one side driven by the output of audio amplifier 150. In typical multi-motored manipulators, the other side of headphone 171 would be driven by circuitry similar to that shown in FIG. 2 which would be used to process signals associated with another axis such as the X axis.

Alternatively, instead of sampling motor current, manipulator force can be determined by placing a differential hydraulic pressure sensor in an appropriate part of hydraulic actuator 4. Differential pressure transducer 180 is shown mounted on actuator 4 to sense the difference in pressure between the outside ambient pressure and the internal hydraulic pressure within actuator 4 and is of a type which provides a proportional DC output signal. Switch 181 can be used to select between hydraulically or electrically derived manipulator force signals. In practice, it will usually be cheaper to use motor current sensing, but certain applications may make the use of hydraulic pressure transducers attractive. Although not shown, manipulator speed signals could be derived by appropriate measurement of hydraulic flow rather than measurement of motor voltage as shown herein. The advantages of measuring motor voltage and current parameters include the elimination of the need for additional cabling from remotely mounted sensor transducers. Motor voltage and current can easily be sensed, for example, on the deck of a ship which is suppling voltage and current to an undersea manipulator. It is not necessary to run extra cabling up from the remotely situated electric motor powered manipulator for the purpose of relaying manipulator speed and force data. While motor voltage and current are not absolutely accurate indicators of manipulator force and speed, they provide sufficiently close approximations to greatly aid in user control.

Another alternative means of deriving manipulator force signals include the use of external transducers such as strain gauges, load cells, and other force transducers well known in the art. Similarly, speed signals can be derived from the more traditional methods and means including tachometers and displacement transducers.

In FIG. 1 it is seen that the means responsive to manipulators speed is simply a direct connection to the motor voltage signal 107 which appears at the output of motor drive amplifier 103. An alternative and equally satisfactory configuration is seen in FIG. 2 where the means responsive to manipulator speed is a connection 11 to the Y axis output 102 of joystick 100. A signal which appears at 11 is, in the preferred embodiment, a DC voltage which is amplified and used to power the Y axis electric motor. The output 102 from joystick 100 can be viewed as a user adjustable speed control signal. Either this user adjustable speed control signal or motor drive voltage itself may be monitored and used to provide an electrical signal which is proportional to manipulator speed.

The circuitry shown in FIG. 2 has an additional feature not shown in the basic embodiment illustrated in FIG. 1. In FIG. 2, IC 70 and IC 80 are configured together to provide, in addition to the before mentioned amplitude and frequency modulation features shown in FIG. 1, an additional modulation means for repetitively varying the frequency of the output from IC 80 at a repetition rate proportional to manipulator force. It would be possible to instead provide a repetitive variation of a user detectable output characteristic other than frequency. Instead of warbling the output frequency a variable rate gating could be used to pulse the output or, alternatively, other user detectable characteristics such as harmonic content could be varied through the use of filters or other well known methods. In FIG. 2, the output from IC 80 is sweep frequency modulated up and down to produce a warble effect having a repetition rate proportional to the force signal derived from the motor current sensed by resistor 16. The summed inverted output of IC 90 provides the frequency sweep control voltage at pin 7 of IC 80. This frequency sweep control voltage can be varied for adjusting the bandwidth over which the output frequency of IC 80 is swept. Referring to FIG. 2, the output from headphone amplifier 150 is heard by the user as a warbling tone having a center frequency proportional to manipulator speed. The term center frequency is used to refer to the pitch of the speed proportional tone. The warble component varies this pitch up and down at a warble rate proportional to manipulator force. The warbling tone has an amplitude or volume which is proportional to manipulator force. In FIG. 2, IC 80 is coupled to manipulator force signals in such a way that with no load or input drive signal to the motor, the output from IC 80 is zero volts. In this way means are provided for silencing audible outputs from the generator formed by IC 70 and 80 when signals indicating zero manipulator speed and zero manipulator force are detected.

When the instant invention is used in connection with manipulators utilizing hydraulic or pneumatic power the manipulators speed and force can be sensed through appropriate installations of pressure and flow transducers. In FIG. 2, a differential pressure transducer 180 is shown connected for sensing the difference between ambient outside pressure and pressure within the hydraulic portion of the manipulator. The differential pressure proportional DC output of 180 can be used in place of the motor current proportional voltage derived across resistor 16. As previously mentioned, manipulator speed could alternatively be sensed by a flow sensor installed at an appropriate point in a pneumatic or hydraulic system where flow rate is proportional to manipulator speed.

What is claimed is:

1. An audio feedback system for monitoring and aiding in user control of a remotely operated, powered manipulator comprising:
    means providing an electrical signal proportional to manipulator force;
    means providing an electrical signal proportional to manipulator speed;
    a signal generator;
    frequency modulation means connected to one of said electrical signals for varying the output frequency of said signal generator in proportion to said signal;
    amplitude modulation means connected to the other of said electrical signals for varying the output amplitude of said signal generator in proportion to said other signal; and
    means for audibly reproducing the output of said signal generator.

2. The device of claim 1 wherein:
    said manipulator is powered by an electric motor;
    said first named means is a motor current sensor;
    said second named means is a motor voltage sensor;
    said amplitude modulation means is connected to said first named electrical signal; and
    said frequency modulation means is connected to said second named electrical signal.

3. The device of claim 1 wherein:
    said manipulator is powered by an electric motor;
    motor speed is controlled by a user-adjustable speed control signal;
    said first named means is a motor current sensor;
    said second named means is a speed control signal sensor;
    said amplitude modulation means is connected to said first named electrical signal; and
    said frequency modulator means is connected to said second named electrical signal.

4. The device of claim 3 wherein:
    said user adjustable speed control signal is a DC voltage; and
    said DC voltage is amplified to supply drive power for said electric motor.

5. The device of claim 2 wherein:
    said electrical signals are DC voltages.

6. The device of claim 1 further comprising:
    additional modulation means connected to one of said electrical signals for repetitively varying a user-detectable output characteristic of said signal generator at a repetition rate proportional to said electrical signal.

7. The device of claim 6 wherein:
    said user-detectable output characteristic is frequency;
    said additional modulation means is a sweep frequency modulator for repetitively sweeping the output frequency of said generator up and down to produce a warble effect having a warble repetition rate proportional to said connected electrical signal.

8. The device of claim 7 wherein:
    said sweep frequency modulator is connected to said first named electrical signal for producing a signal generator output frequency warble having a repetition rate proportional to manipulator force.

9. The device of claim 8 further comprising:
    means for adjusting said sweep frequency modulator to vary the bandwidth over which the signal generator output frequency is swept.

10. The device of claim 2 further comprising:
    a variable rate sweep frequency modulator connected to said first-named electrical signal for producing a cyclical variation in generator output frequency at a repetition rate proportional to manipulator force; and
    an earphone for audibly reproducing the output of said generator.

11. The device of claim 10 wherein the audibly reproduced output of said signal generator is a warbling tone having a center frequency proportional to manipulator speed, a warble rate proportional to manipulator force, and an amplitude proportional to manipulator force.

12. The device of claim 1 further comprising:
    gating means connected to said signal generator and connected to said electrical signals for silencing generator output when signals indicating zero manipulator speed and zero manipulator force are detected.

13. The device of claim 1 wherein:
    said manipulator utilizes hydraulic power; and
    said first named means is a hydraulic pressure sensor.

14. The device of claim 1 wherein said manipulator utilizes hydraulic power and said second-named means is a hydraulic flow sensor.

15. The device of claim 13 wherein said hydraulic pressure sensor is of the differential pressure sensing type and is mounted to sense the difference between ambient outside pressure and pressure within the hydraulic power system.

16. The device of claim 14 wherein:
    said hydraulic flow sensor is mounted to sense hydraulic fluid flow rate at a point in the hydraulic system where said flow rate is proportional to manipulator speed.

17. A method for generating an audio tone useful as a feedback signal for user control of remotely operated, powered manipulators comprising the steps of:
    generating a force signal proportional to manipulator force;
    generating a speed signal proportional to manipulator speed;
    generating an audio tone;
    varying the frequency of said tone in proportion to said speed signal; and varying the amplitude of said tone in proportion to said force signal.

18. The method of claim 17 further comprising:
cyclically varying the frequency of said tone at a repetition rate in proportion to said force signal.

19. The method of claim 18 further comprising the steps of:
powering said manipulator by an electric motor;
sensing manipulator speed by monitoring motor current;
sensing manipulator speed by monitoring motor voltage;
providing said force signal in the form of a DC voltage;
providing said speed signal in the form of a DC voltage; and
amplifying and supplying said audio tone to a speaker.

20. The method of claim 18 further including the steps of:
powering said manipulator by an electric motor;
controlling motor speed by a user adjustable speed control signal;
sensing manipulator force by monitoring motor current; and
monitoring manipulator speed by sensing said speed control signal.

21. The method of claim 18 further including the steps of:
powering said manipulator with hydraulic power; and
sensing manipulator force by monitoring manipulator hydraulic pressure.

22. A method for improving user control of the displacement of a remotely operated, powered manipulator by providing an audio tone useful in controlling displacement of said manipulator, the method comprising the steps of:
generating an audio tone;
varying the frequency of said tone in proportion to the speed of displacement of said manipulator;
varying the amplitude of said tone in proportion to the force resisting displacement of said manipulator; and
controlling the displacement of said manipulator as said tone varies.

23. A method of controlling the displacement of a remotely operated, powered manipulator including the steps of displacing said manipulator by control means, providing a feedback signal from said manipulator as to manipulator displacement, and varying the operation of said control means based upon said feedback signal, wherein the improvement in said method is comprised of:
said step of providing a feedback signal being accomplished by generating an audio tone;
varying the frequency of said tone in proportion to the speed of manipulator displacement;
varying the amplitude of said tone in proportion to the force resisting manipulator displacement; and
feeding the varying tone back to enable operation of said control means.

* * * * *